(12) United States Patent
Chen

(10) Patent No.: US 9,723,297 B2
(45) Date of Patent: Aug. 1, 2017

(54) 3D DISPLAY DEVICE

(71) Applicant: SHENZHEN CHINA STAR OPTOELECTRONICS TECHNOLOGY CO. LTD., Guangdong (CN)

(72) Inventor: Jianhong Chen, Guangdong (CN)

(73) Assignee: SHENZHEN CHINA STAR OPTOELECTRONICS TECHNOLOGY CO. LTD., Guangdong (CN)

( * ) Notice: Subject to any disclaimer, the term of this patent is extended or adjusted under 35 U.S.C. 154(b) by 81 days.

(21) Appl. No.: 14/771,506

(22) PCT Filed: Jul. 31, 2015

(86) PCT No.: PCT/CN2015/085755
§ 371 (c)(1),
(2) Date: Aug. 31, 2015

(87) PCT Pub. No.: WO2017/004859
PCT Pub. Date: Jan. 12, 2017

(65) Prior Publication Data
US 2016/0212414 A1 Jul. 21, 2016

(30) Foreign Application Priority Data
Jul. 6, 2015 (CN) .......................... 2015 1 0391197

(51) Int. Cl.
*G02B 27/22* (2006.01)
*H04N 13/04* (2006.01)
(Continued)

(52) U.S. Cl.
CPC ......... *H04N 13/0404* (2013.01); *G02B 5/201* (2013.01); *G02B 5/28* (2013.01);
(Continued)

(58) Field of Classification Search
CPC ................ G02B 27/22; G02B 27/2214; H04N 13/0402; H04N 13/0404; H04N 13/0406; H04N 13/0438
(Continued)

(56) References Cited

U.S. PATENT DOCUMENTS 6,980,176 B2 * 12/2005 Matsumoto ........ G02B 27/2214
345/6
7,085,049 B2 * 8/2006 Hong ................. G02B 27/2207
348/60
(Continued)

FOREIGN PATENT DOCUMENTS

CN 104460019 A 3/2015

*Primary Examiner* — Audrey Y Chang
(74) *Attorney, Agent, or Firm* — Mark M. Friedman

(57) ABSTRACT

A 3D display device is provided. The 3D display device includes a collimated backlight, a display module, an interference filter, and a lens array. The collimated backlight herein includes a first sub-backlight source and a second sub-backlight source. The display module includes a plurality of sub-pixel units. The interference filter includes a plurality of first interference filter units and second interference filter units. The lens array includes a plurality of lens units. The 3D display device of the present invention has a higher resolution and a wider viewing angle.

14 Claims, 2 Drawing Sheets

(51) Int. Cl.
 *G02B 5/20* (2006.01)
 *G02B 5/28* (2006.01)
(52) U.S. Cl.
 CPC ..... *G02B 27/2214* (2013.01); *H04N 13/0409* (2013.01); *H04N 13/0422* (2013.01)
(58) Field of Classification Search
 USPC ............... 359/462, 463, 464; 348/56, 59, 60
 See application file for complete search history.

(56) References Cited

U.S. PATENT DOCUMENTS

| | | | |
|---|---|---|---|
| 7,990,498 B2* | 8/2011 | Hong | G02B 27/22 349/106 |
| 8,403,487 B2* | 3/2013 | Lee | G02B 27/2214 353/7 |
| 9,118,890 B2* | 8/2015 | Brown Elliott | H04N 13/0007 |
| 2016/0173860 A1 | 6/2016 | Wang et al. | |

* cited by examiner

3D DISPLAY DEVICE

TECHNICAL FIELD OF THE INVENTION

The present invention relates to a display technology, and in particular to a three-dimensional (3D) display device.

BACKGROUND OF THE INVENTION

As society develops, people demand an increasingly display quality for display panels, especially with the development of 3D display devices. Users hope to have a 3D display device being simple to operate and having a low manufacturing cost.

FIG. 1 is a schematic drawing illustrating a conventional 3D display device. The 3D display device 10 includes a display module 11 and a lens array 12. The display module 11 includes a plurality of sub-pixel units 111; the lens array 12 includes a plurality of lens units 121. One lens unit 121 corresponds to at least one sub-pixel unit 111. Images of the display module 11 are projected into space through the lens array 12 in an orthogonal projection or a perspective projection for restoring a 3D scene. Human eyes can see different images in a specific viewing area, thereby forming a 3D image.

However, the above-mentioned 3D display device 10 needs to simultaneously display a right-eye image and a left-eye image in one frame of images. This will reduce a resolution of the 3D display device 10, and a viewing angle of the user is narrow.

Therefore, there is a significant need to provide a 3D display device for solving the problems existing in the prior art.

SUMMARY OF THE INVENTION

An objective of the present invention is to provide a 3D display device with a higher resolution and a wider viewing angle for solving the problems of the lower resolution and the narrow viewing angle in the prior art 3D display device.

To achieve the foregoing objective, the technical solution of this invention is implemented as follows.

An embodiment of the present invention provides a 3D display device, which includes: a collimated backlight comprising a first sub-backlight source utilized to emit an outgoing light with a first spectrum and a second sub-backlight source utilized to emit an outgoing light with a second spectrum; a display module utilized to display images according to data signals, scanning signals, and the outgoing light of the collimated backlight, the display module comprising a plurality of sub-pixel units; an interference filter comprising a plurality of interference filter units, each of the interference filter units corresponding to at least one of the sub-pixel units, wherein the interference filter unit is a first interference filter unit which is utilized to filter the outgoing light with the first spectrum or a second interference filter unit which is utilized to filter the outgoing light with the second spectrum; and a lens array comprising a plurality of lens units utilized to converge an outgoing light from the first interference filter unit and to converge an outgoing light from the second interference filter unit for achieving a naked-eye 3D display; wherein the lens units correspond one-to-one with the interference filter units of the interference filter; the lens units are lenticular lens units or spherical lens units.

In the 3D display device of the present invention, the outgoing light with the first spectrum comprises a red light, whose wavelength is within a first wavelength range, a green light, whose wavelength is within a second wavelength range, and a blue light, whose wavelength is within a third wavelength range; the outgoing light with the second spectrum comprises a red light, whose wavelength is within a fourth wavelength range, a green light, whose wavelength is within a fifth wavelength range, and a blue light, whose wavelength is within a sixth wavelength range; wherein the first wavelength range and the fourth wavelength range are staggered each other, the second wavelength range and the fifth wavelength range are staggered each other, and the third wavelength range and the sixth wavelength range are staggered each other.

In the 3D display device of the present invention, the interference filter units are lenticular interference filter units if the lens units are the lenticular lens units; the interference filter units are spherical interference filter units if the lens units are the spherical lens units.

In the 3D display device of the present invention, the first interference filter units and the second interference filter units are disposed alternately.

In the 3D display device of the present invention, when the 3D display device displays a left-eye image, the first sub-backlight source of the collimated backlight works, and the second sub-backlight source stops work; the display module displays the left-eye image by a position corresponding to the second interference filter unit utilized as a pixel center.

In the 3D display device of the present invention, when the 3D display device displays a right-eye image, the second sub-backlight source of the collimated backlight works, and the first sub-backlight source stops work; the display module displays the right-eye image by a position corresponding to the first interference filter unit utilized as a pixel center.

In the 3D display device of the present invention, when the 3D display device displays 2D images, the first sub-backlight source and the second sub-backlight source of the collimated backlight work simultaneously, the display module displays the 2D images by a position corresponding to the first interference filter unit and/or the second interference filter unit utilized as a pixel center.

In the 3D display device of the present invention, when the 3D display device displays 3D images, a left-eye image frame and a corresponding right-eye image frame are displayed alternately.

An embodiment of the present invention further provides a 3D display device, which includes: a collimated backlight comprising a first sub-backlight source utilized to emit an outgoing light with a first spectrum and a second sub-backlight source utilized to emit an outgoing light with a second spectrum; a display module utilized to display images according to data signals, scanning signals, and the outgoing light of the collimated backlight, the display module comprising a plurality of sub-pixel units; an interference filter comprising a plurality of interference filter units, each of the interference filter units corresponding to at least one of the sub-pixel units, wherein the interference filter unit is a first interference filter unit which is utilized to filter the outgoing light with the first spectrum or a second interference filter unit which is utilized to filter the outgoing light with the second spectrum; and a lens array comprising a plurality of lens units utilized to converge an outgoing light from the first interference filter unit and to converge an outgoing light from the second interference filter unit for achieving a naked-eye 3D display.

In the 3D display device of the present invention, the lens units correspond one-to-one with the interference filter units of the interference filter.

In the 3D display device of the present invention, the outgoing light with the first spectrum comprises a red light, whose wavelength is within a first wavelength range, a green light, whose wavelength is within a second wavelength range, and a blue light, whose wavelength is within a third wavelength range; the outgoing light with the second spectrum comprises a red light, whose wavelength is within a fourth wavelength range, a green light, whose wavelength is within a fifth wavelength range, and a blue light, whose wavelength is within a sixth wavelength range; wherein the first wavelength range and the fourth wavelength range are staggered each other, the second wavelength range and the fifth wavelength range are staggered each other, and the third wavelength range and the sixth wavelength range are staggered each other.

In the 3D display device of the present invention, the lens units are lenticular lens units or spherical lens units.

In the 3D display device of the present invention, the interference filter units are lenticular interference filter units if the lens units are the lenticular lens units; the interference filter units are spherical interference filter units if the lens units are the spherical lens units.

In the 3D display device of the present invention, the first interference filter units and the second interference filter units are disposed alternately.

In the 3D display device of the present invention, when the 3D display device displays a left-eye image, the first sub-backlight source of the collimated backlight works, and the second sub-backlight source stops work; the display module displays the left-eye image by a position corresponding to the second interference filter unit utilized as a pixel center.

In the 3D display device of the present invention, when the 3D display device displays a right-eye image, the second sub-backlight source of the collimated backlight works, and the first sub-backlight source stops work; the display module displays the right-eye image by a position corresponding to the first interference filter unit utilized as a pixel center.

In the 3D display device of the present invention, when the 3D display device displays 2D images, the first sub-backlight source and the second sub-backlight source of the collimated backlight work simultaneously, the display module displays the 2D images by a position corresponding to the first interference filter unit and/or the second interference filter unit utilized as a pixel center.

In the 3D display device of the present invention, when the 3D display device displays 3D images, a left-eye image frame and a corresponding right-eye image frame are displayed alternately.

In comparison with the prior art 3D display device, the 3D display device of the present invention improves the display resolution of the 3D display device and improves the viewing angle of the 3D display device by disposing an interference filter, whereby the problems of lower resolution and a narrow viewing angle in the prior art 3D display device are solved.

It is to be understood that both the foregoing general description and the following detailed description of the present invention are exemplary and explanatory and are intended to provide further explanation of the invention as claimed.

DETAILED DESCRIPTION OF THE INVENTION

Figure 1:
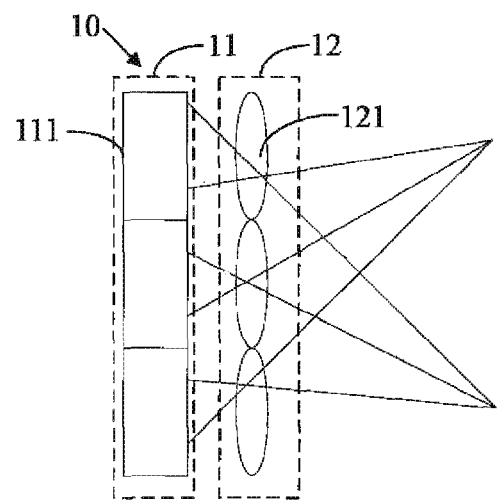
FIG. 1 is a schematic drawing illustrating a conventional 3D display device.

Descriptions of the following embodiments refer to attached drawings which are utilized to exemplify specific embodiments. Directional terms mentioned in the present invention, such as "top" and "down", "front", "rear", "left", "right", "inside", "outside", "side", and so on are only directions with respect to the attached drawings. Therefore, the used directional terms are utilized to explain and understand the present invention but not to limit the present invention.

In different drawings, the same reference numerals refer to like parts throughout the drawings.

Figure 2:
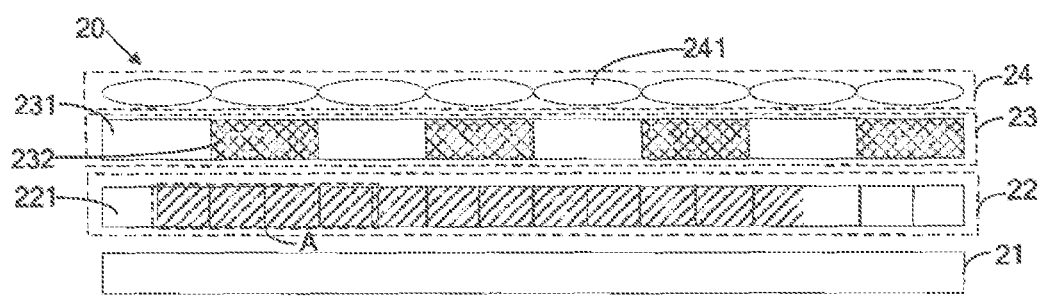
FIG. 2 is a first schematic drawing illustrating a 3D display device according to a preferred embodiment of the present invention.
Figure 3:
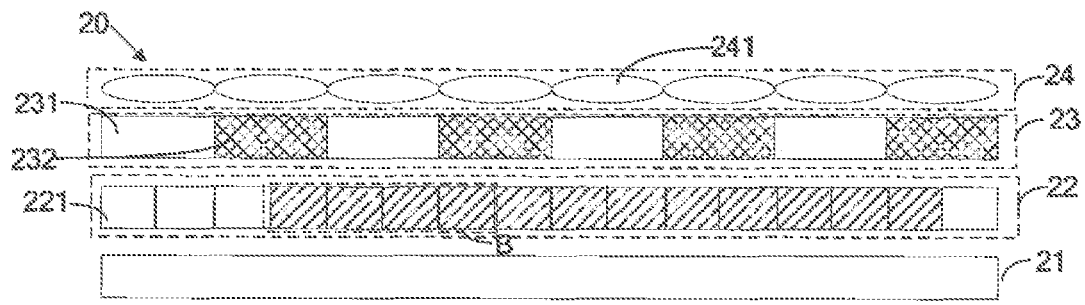
FIG. 3 is a second schematic drawing illustrating a 3D display device according to a preferred embodiment of the present invention.

Referring to FIG. 2 and FIG. 3, FIG. 2 is a first schematic drawing illustrating a 3D display device according to a preferred embodiment of the present invention; FIG. 3 is a second schematic drawing illustrating a 3D display device according to a preferred embodiment of the present invention. The 3D display device 20 of the preferred embodiment includes a collimated backlight 21, a display module 22, an interference filter 23, and a lens array 24.

The collimated backlight 21 includes a first sub-backlight source utilized to emit an outgoing light with a first spectrum and a second sub-backlight source utilized to emit an outgoing light with a second spectrum.

The display module 22 is utilized to display images according to data signals, scanning signals, and the outgoing light of the collimated backlight, and the display module 22 includes a plurality of sub-pixel units 221.

The interference filter 23 includes a plurality of interference filter units, and each of the interference filter units corresponds to at least one of the sub-pixel units 221. In the preferred embodiment, each of the interference filter units corresponds to two sub-pixel units 221. The interference filter unit is a first interference filter unit 231 which is utilized to filter the outgoing light with the first spectrum or a second interference filter unit 232 which is utilized to filter the outgoing light with the second spectrum. The first interference filter units 231 and the second interference filter units 232 are disposed alternately.

The lens array 24 includes a plurality of lens units 241 which are utilized to converge an outgoing light from the first interference filter unit 231 and to converge an outgoing light from the second interference filter unit 232 for achieving a naked-eye 3D display. The lens units 241 correspond one-to-one with the interference filter units of the interference filter 23.

The outgoing light with the first spectrum herein includes a red light, whose wavelength is within a first wavelength range, a green light, whose wavelength is within a second wavelength range, and a blue light, whose wavelength is within a third wavelength range. Specifically, as shown in FIG. 4A, which is a schematic drawing illustrating a spectrum of an outgoing light with a first spectrum in the 3D display device of the preferred embodiment of the present invention, the wavelength range R1 is the first wavelength range; the wavelength range G1 is the second wavelength range; the wavelength range 131 is the third wavelength range.

The outgoing light with the second spectrum includes a red light, whose wavelength is within a fourth wavelength range, a green light, whose wavelength is within a fifth wavelength range, and a blue light, whose wavelength is within a sixth wavelength range. Specifically, as shown in FIG. 4B, which is a schematic drawing illustrating a spectrum of an outgoing light with a second spectrum in the 3D display device of the preferred embodiment of the present invention, the wavelength range R2 is the fourth wavelength range; the wavelength range G2 is the fifth wavelength range; the wavelength range B2 is the sixth wavelength range.

Figure 4A:
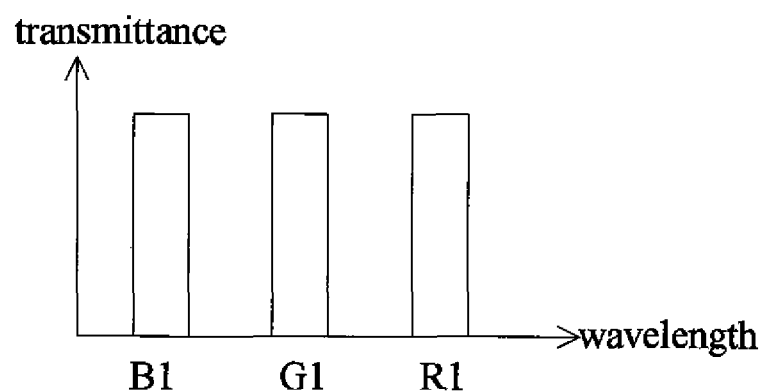
FIG. 4A is a schematic drawing illustrating a spectrum of an outgoing light with a first spectrum in the 3D display device of the preferred embodiment of the present invention.
Figure 4B:
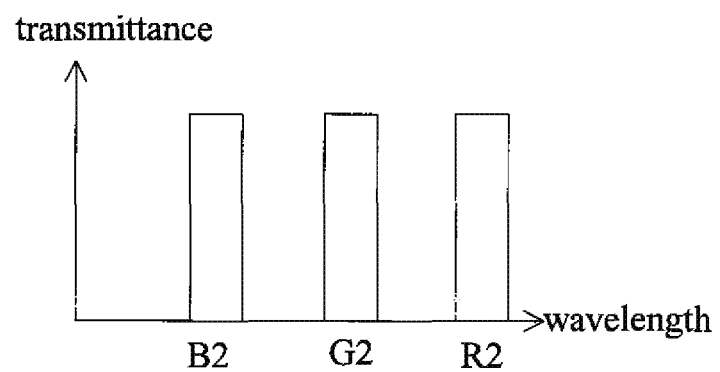
FIG. 4B is a schematic drawing illustrating a spectrum of an outgoing light with a second spectrum in the 3D display device of the preferred embodiment of the present invention.

As shown in FIG. 4A and FIG. 4B, the first wavelength range and the fourth wavelength range are staggered with each other; the second wavelength range and the fifth wavelength range are staggered with each other; the third wavelength range and the sixth wavelength range are staggered with each other. Accordingly, the first spectrum and second spectrum are staggered with each other.

The lens units 241 of the preferred embodiment are lenticular lens units or spherical lens units. When the lens units 241 are the lenticular lens units, the interference filter units are lenticular interference filter units. When the lens units 241 are the spherical lens units, the interference filter units are spherical interference filter units.

The specific operating principle of the 3D display device of the preferred embodiment will now be described in detail with reference to FIG. 2 and FIG. 3.

When the 3D display device 20 displays 3D images, a left-eye image frame and a corresponding right-eye image frame are displayed alternately.

When the 3D display device 20 displays a left-eye image (a frame of left-eye image), as shown in FIG. 2, the first sub-backlight source of the collimated backlight 21 works, and the second sub-backlight source stops work. The outgoing light with the first spectrum emitted from the first sub-backlight source passes through the second interference filter unit 232 completely. The display module 22 displays the left-eye image by a position corresponding to the second interference filter unit 232 utilized as a pixel center, as the sub-pixel units 221 shown in the "A" portion of FIG. 2. Accordingly, the lens unit 241 of the lens array 24 corresponding to the second interference filter unit 232 converges the outgoing light of the second interference filter unit 232, and thereby converges the outgoing light with the second spectrum on the left eye of the user.

When the 3D display device 20 displays a right-eye image (a frame of the right-eye image), as shown in FIG. 3, the second sub-backlight source of the collimated backlight 21 works, and the first sub-backlight source stops work. The outgoing light with the second spectrum emitted from the second sub-backlight source passes through the first interference filter unit 231, completely. The display module 22 displays the right-eye image by a position corresponding to the first interference filter unit 231 utilized as a pixel center, as the sub-pixel units 221 shown in the "B" portion of FIG. 3. Accordingly, the lens unit 241 of the lens array 24 corresponding to the first interference filter unit 231 converges the outgoing light of the first interference filter unit 231, and thereby converges the outgoing light with the first spectrum on the right eye of the user.

Accordingly, the user fuses the left-eye image and the right-eye image to achieve a naked-eye 3D display. Meanwhile, displaying the left-eye image or the right-eye image only in a single frame of images improves the display resolution of the 3D display device 20 and improves the viewing angle of the 3D display device 20.

When the 3D display device 20 displays 2D images, the first sub-backlight source and the second sub-backlight source of the collimated backlight work, simultaneously. The outgoing light with the second spectrum emitted from the second sub-backlight source passes through the first interference filter unit 231, completely. The outgoing light with the first spectrum emitted from the first sub-backlight source passes through the second interference filter unit 232, completely. The display module 22 displays the 2D images by a position corresponding to the first interference filter unit 231 and the second interference filter unit 232 utilized as a pixel center. Accordingly, the lens unit 241 of the lens array 24 corresponding to the first interference filter unit 231 converges the outgoing light of the first interference filter unit 231, the lens unit of the lens array corresponding to the second interference filter unit 232 converges the outgoing light of the second interference filter unit 232, and thereby converges the outgoing light with the first spectrum and the second spectrum on the eyes of the user.

Certainly, the display module 22 herein may display the 2D images by the position corresponding to the first interference filter unit 231 utilized as the pixel center or the position corresponding to the second interference filter unit 232 utilized as the pixel center.

The 3D display device of the present invention improves the display resolution of the 3D display device and improves the viewing angle of the 3D display device by disposing the interference filter, whereby the problems of lower resolution and a narrow viewing angle in the prior art 3D display device are solved.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A three-dimensional (3D) display device, comprising:
   a collimated backlight comprising a first sub-backlight source utilized to emit an outgoing light with a first spectrum and a second sub-backlight source utilized to emit an outgoing light with a second spectrum;
   a display module utilized to display images according to data signals, scanning signals, and the outgoing light of the collimated backlight, the display module comprising a plurality of sub-pixel units, the display module displaying a left-eye image with the illumination of the first sub-backlight source of the first spectrum and displaying a right-eye image with the illumination of the second sub-backlight of the second spectrum in time sequential manner;
   an interference filter comprising a plurality of interference filter units, each of the interference filter units corresponding to at least one of the sub-pixel units, wherein the plurality of interference filter units comprises alternatively arranged first interference filter unit utilized to filter the outgoing light with the first spectrum and a second interference filter unit utilized to filter the outgoing light with the second spectrum; and a lens array comprising a plurality of lens units utilized to converge an outgoing light from the first interference filter unit and to converge an outgoing light from the second interference filter unit for achieving a naked-eye 3D display;

wherein the lens units correspond one-to-one with the interference filter units of the interference filter; the lens units are lenticular lens units or spherical lens units.

2. The 3D display device according to claim 1, wherein the outgoing light with the first spectrum comprises a red light, whose wavelength is within a first wavelength range, a green light, whose wavelength is within a second wavelength range, and a blue light, whose wavelength is within a third wavelength range;

the outgoing light with the second spectrum comprises a red light, whose wavelength is within a fourth wavelength range, a green light, whose wavelength is within a fifth wavelength range, and a blue light, whose wavelength is within a sixth wavelength range;

wherein the first wavelength range and the fourth wavelength range are arranged neighboring to each other, the second wavelength range and the fifth wavelength range are arranged neighboring to each other, and the third wavelength range and the sixth wavelength range are arranged neighboring to each other.

3. The 3D display device according to claim 1, wherein the interference filter units are lenticular interference filter units if the lens units are the lenticular lens units, and the interference filter units are spherical interference filter units if the lens units are the spherical lens units.

4. The 3D display device according to claim 1, wherein when the 3D display device displays the left-eye image, the first sub-backlight source of the collimated backlight works, and the second sub-backlight source stops work.

5. The 3D display device according to claim 1, wherein when the 3D display device displays the right-eye image, the second sub-backlight source of the collimated backlight works, and the first sub-backlight source stops work.

6. The 3D display device according to claim 1, wherein when the 3D display device displays 2D images, the first sub-backlight source and the second sub-backlight source of the collimated backlight work simultaneously, the display module displays the 2D images by a position corresponding to the first interference filter unit and/or the second interference filter unit utilized as a pixel center.

7. A 3D display device, comprising:
a collimated backlight comprising a first sub-backlight source utilized to emit an outgoing light with a first spectrum and a second sub-backlight source utilized to emit an outgoing light with a second spectrum;
a display module utilized to display images according to data signals, scanning signals, and the outgoing light of the collimated backlight, the display module comprising a plurality of sub-pixel units, the display module displaying a left-eye image with the illumination of the first sub-backlight source of the first spectrum and displaying a right-eye image with the illumination of the second sub-backlight of the second spectrum in time sequential manner;
an interference filter comprising a plurality of interference filter units, each of the interference filter units corresponding to at least one of the sub-pixel units, wherein the plurality of interference filter units comprises alternatively arranged first interference filter unit utilized to filter the outgoing light with the first spectrum and a second interference filter unit utilized to filter the outgoing light with the second spectrum; and
a lens array comprising a plurality of lens units utilized to converge an outgoing light from the first interference filter unit and to converge an outgoing light from the second interference filter unit for achieving a naked-eye 3D display.

8. The 3D display device according to claim 7, wherein the lens units correspond one-to-one with the interference filter units of the interference filter.

9. The 3D display device according to claim 7, wherein the outgoing light with the first spectrum comprises a red light, whose wavelength is within a first wavelength range, a green light, whose wavelength is within a second wavelength range, and a blue light, whose wavelength is within a third wavelength range;

the outgoing light with the second spectrum comprises a red light, whose wavelength is within a fourth wavelength range, a green light, whose wavelength is within a fifth wavelength range, and a blue light, whose wavelength is within a sixth wavelength range;

wherein the first wavelength range and the fourth wavelength range are arranged neighboring to each other, the second wavelength range and the fifth wavelength range are arranged neighboring to each other, and the third wavelength range and the sixth wavelength range are arranged neighboring to each other.

10. The 3D display device according to claim 7, wherein the lens units are lenticular lens units or spherical lens units.

11. The 3D display device according to claim 10, wherein the interference filter units are lenticular interference filter units if the lens units are the lenticular lens units; the interference filter units are spherical interference filter units if the lens units are the spherical lens units.

12. The 3D display device according to claim 7, wherein when the 3D display device displays the left-eye image, the first sub-backlight source of the collimated backlight works, and the second sub-backlight source stops work.

13. The 3D display device according to claim 7, wherein when the 3D display device displays the right-eye image, the second sub-backlight source of the collimated backlight works, and the first sub-backlight source stops work.

14. The 3D display device according to claim 7, wherein when the 3D display device displays 2D images, the first sub-backlight source and the second sub-backlight source of the collimated backlight work simultaneously, the display module displays the 2D images by a position corresponding to the first interference filter unit and/or the second interference filter unit utilized as a pixel center.

* * * * *